Patented Aug. 3, 1948

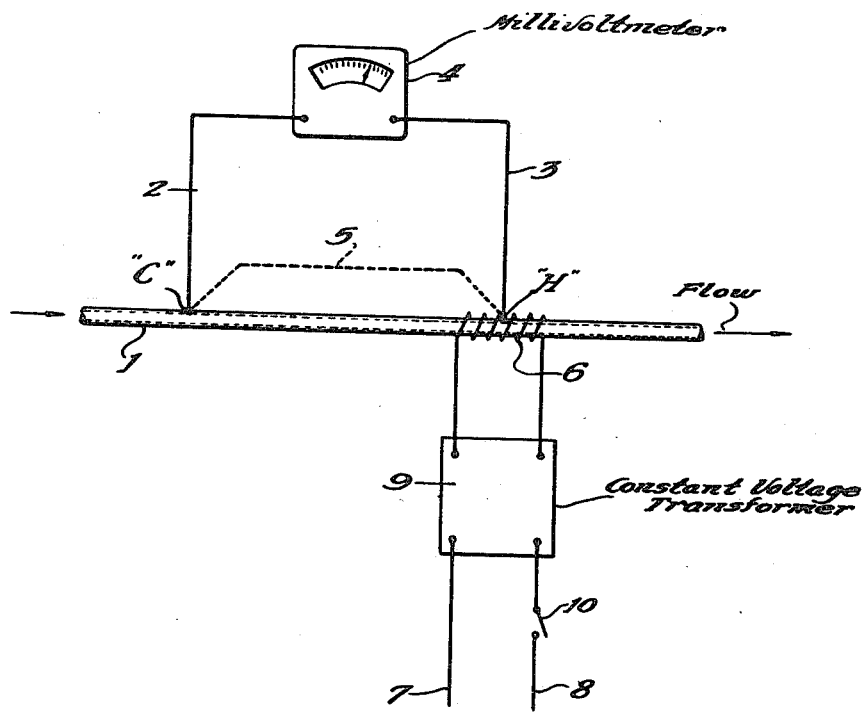

2,446,283

UNITED STATES PATENT OFFICE 2,446,283

FLOW MEASURING DEVICE

Herbert A. Hulsberg, Hinsdale, Ill., assignor to Universal Oil Products Company, Chicago, Ill., a corporation of Delaware Application January 31, 1945, Serial No. 575,503

1 Claim. (Cl. 73—204)

This invention relates to a method and apparatus for measuring flows of fluid materials through small conduits or tubing. The improvements on the device are such that direct contact with the fluid is unnecessary; thus it is particularly adaptable for measuring fluid flows that are normally difficult to measure because of the type of fluid or because of the pressure conditions.

One object of the invention is to provide an apparatus which will measure very small flow rates through small conduits, that are particularly difficult to measure by other means, such as small quantities of hydrogen or other light gases. Another object of the invention is to provide an apparatus which is adaptable for use in high pressure service or for use with corrosive materials without complicating the construction details. A still further object of the invention is to provide a substantially accurate measuring device which is readily adaptable to use in connection with tubing or small piping of any flow system.

This invention is based on the thermoelectric principle of an electric current being set up where two dissimilar metals are used in a circuit and where one of the junctions between the two dissimilar metals is at a higher temperature than the other junction. By using the metal piping as one element or material and by connecting to it at spaced points two wires of a different metal and of proper thermoelectric characteristics, which lead to a millivoltmeter or a potentiometer, a thermocouple arrangement is made. Thus, by heating one of the junctions between the wire and tubing, a voltage reading will be obtained on the millivoltmeter in the circuit.

In operation the fluid flow through the tubing or conduit will act to cool the heated junction and decrease the voltage from that obtained before starting the flow. The degree of cooling and the variation in the millivoltmeter reading will vary as the flow rate through the conduit. In order to obtain a hot junction, an electric heating coil may be placed around the conduit or tubing at the point of one of the wire connections to the tubing. This heating coil may be connected to a constant voltage transformer in order to obtain a substantially constant coil temperature independent of variations in the line voltage. A constant temperature differential between the unheated cold junction and the hot junction when there is no fluid flow is necessary for accurate measurements. Thus, by making a preliminary calibration of the millivolt-meter or the potentiometer for a given fluid material this improved apparatus may be used to observe the flow rate of the given fluid as indicated by the millivoltmeter or the potentiometer.

The calibration of the apparatus may be made in any desired manner, by checking against a standard meter, or by flowing the given fluid into a measured container to displace a liquid, and obtain a calibrated millivoltmeter scale by making several timed readings for varying flow rates. The calibration appears to be independent of pressure for some fluid materials, such as hydrogen or other light gases having a constant specific heat value, but for other materials the meter may require calibration at the approximate pressure which is to be used in the operation.

Present types of apparatus generally require some element of the apparatus to be in contact with the fluid stream, which is a distinct disadvantage. For example, it would be difficult to place a heated element into a small tubing of $\frac{1}{16}$ inch internal diameter or the like. Also other difficulties arise when placing wires or parts of an apparatus into a tube to be used for high pressure service or when encountering corrosive fluids. In contrast, the improved form of the apparatus of this invention is independent of the pressure, or the type of fluid being used, or the smallness of the tubing or conduit. The new device, however, is limited, in general, for use with small conduits or tubing for measuring flow rates readily and with considerable accuracy, while relatively large flow rates having streamline flow in large conduits are not as easily or readily measured by this method.

Briefly, one form of the improved apparatus, for measuring fluid flow, comprises two wires of a proper thermoelectric metal which are attached to the piping or tubing being used, at two spaced apart points, with each wire connecting to a millivoltmeter or potentiometer to complete a thermocouple circuit. The tubing at one of the wire connections or junctions to the tubing is heated by a constant voltage heating coil to provide a hot junction in the circuit. In order to obtain a good thermoelectric current, the wires may be of constantan in combinaion with steel or copper tubing. When a non-metallic tubing is used, a wire must be connected between the hot and the cold junctions in order to complete a dissimilar metal thermocouple circuit.

The thermocouple wire connections should be made such that the fluid flow through the tubing is from the cold junction toward the hot junction, so that there is heat lost by the hot junction to the flowing fluid material. The temperature drop is very sharp even for low flow rates, resulting in a decreased voltage at the millivoltmeter or potentiometer. This temperature drop is more pronounced than would be a temperature increase if the fluid flow were made from the hot junction toward the cold junction.

The accompanying diagrammatic drawing illustrates one form of the apparaus and should make more apparent the features of this invention for measuring small flows of fluids.

Referring to the drawing, the numeral 1 denotes a metal conduit or tubing carrying a liquid or gas, the flow rate of which is to be measured. The fluid flow through the tubing is in the direction indicated by the arrows. The wires 2 and 3 are connected to the millivoltmeter 4, thus a thermoelectric circuit is established with one junction made at "C" and the other junction at "H." With the tubing 1 of stainless steel, iron or copper then the wires 2 and 3 may be of constantan in order to obtain two dissimilar metals with good thermoelectric characteristics. When the tubing 1 is non-metallic, a connecting wire 5 (shown by the dotted line) must be placed between the two connections "C" and "H" in order to complete the circuit. A resistance heating coil 6 is placed around the connection of junction "H" to obtain a hot junction in contrast to the cold junction "C." In this manner a potential difference is set up in the thermoelectric circuit that can be measured on the millivoltmeter 4. The power supply for the heating coil 6 is supplied through lines 7 and 8 and the constant voltage transformer 9. The use of a constant voltage transformer 9 results in a substantially constant current through the heating coil 6, and a more constant temperature differential between the junctions "C" and "H" with no fluid flow. The switch 10 is used to turn on and off the electric power to the heating coil.

To illustrate the operation of the device it will be assumed that it is to be used to measure the flow rate of hydrogen, which is at a 1000 lbs. per square inch pressure and is to be introduced through a small stainless steel tube 1 at a relatively slow velocity into a vessel for use in connection with a chemical conversion process. With a stainless steel tube 1, the thermocouple wires 2 and 3 may be of constantan, to result in good thermoelectric characteristics. The constant voltage transformer 9 may be of any standard make, and suitable for the available power supply through lines 7 and 8, while the millivoltmeter may be any standard moving coil instrument. As previously mentioned the scale on the millivoltmeter 4 must be calibrated to read in terms of velocity, or a chart may be used which will transfer E. M. F. millivoltmeter readings into terms of gas flow. By making a series of timed measurements for varying flow rates a substantially accurate calibrated scale may be established.

In operation the switch 10 is closed and the heating coil 6 is allowed to bring the tube 1 up to maximum temperature at the junction "H." The apparatus is then ready to measure flow rate. With a given flow rate through the tube 1 the hot junction "H" is cooled, heat being lost to the hydrogen flowing within the small tubing 1, and a flow rate is obtained by reading the millivoltmeter.

Slightly varying temperature in a room or place where the apparatus is used should not give any great inaccuracies, since the device is self compensating with equal temperature changes occurring on both the "H" and "C" junctions. However, if the apparatus must be subjected to drafts or unequal heating conditions, then insulation may be placed around the pipe and connection points in order to maintain accuracy of performance.

For hydrogen, the calibration appears to be independent of the pressure; however, for air and many other gases or liquids whose specific heat varies considerably with pressure, the calibration must also vary with the pressure.

Although the apparatus is used for the measurement of a gas in the above example, it should be noted that the device is equally operative for measuring small liquid flows, down to the point where the rate is one drop at a time. However, for either liquid or gases the apparatus is best suited for use with relatively small tubes or conduits, since for large tubing or conduits having stream-line flow conditions the required accuracy may not be obtained.

It is not intended to limit this device to that illustrated, or only to the materials mentioned above since there are many variations which can come within the scope of this invention. There are several types of wires and metals that may be used which have proper thermoelectric characteristics; and there are various types of meters which may be used to measure voltage or varying potential in the circuit. Also other means than that shown may be used to maintain a constant heat on the conduit at the hot junction point.

I claim as my invention:

An apparatus for determining fluid flow through a small metallic conduit, said apparatus comprising a thermocouple circuit with said metallic conduit forming one element of the thermocouples and wires of a metal different from the conduit being attached to said conduit at spaced apart points to provide the other element of said thermocouples, a millivoltmeter in said thermocouple circuit, a heating coil placed around said conduit at one of the wire junction points with said conduit and said heating coil having a constant voltage supply.

HERBERT A. HULSBERG.

REFERENCES CITED

The following references are of record in the file of this patent:

UNITED STATES PATENTS

| Number | Name | Date |
| --- | --- | --- |
| 1,890,985 | Hamblen et al. | Dec. 13, 1932 |
| 2,061,941 | Hukill | Nov. 24, 1936 |
| 2,279,043 | Harrington | Apr. 7, 1942 |

FOREIGN PATENTS

| Number | Country | Date |
| --- | --- | --- |
| 44,482 | France | Jan. 26, 1934 |
| 761,973 | France | Jan. 13, 1934 |